United States Patent
Jang

(10) Patent No.: US 8,358,869 B2
(45) Date of Patent: Jan. 22, 2013

(54) IMAGE PROCESSING APPARATUS AND METHOD, AND A RECORDING MEDIUM STORING A PROGRAM FOR EXECUTING THE IMAGE PROCESSING METHOD

(75) Inventor: Soon-geun Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 832 days.

(21) Appl. No.: 12/533,102

(22) Filed: Jul. 31, 2009

(65) Prior Publication Data

US 2010/0027904 A1   Feb. 4, 2010

(30) Foreign Application Priority Data

Aug. 1, 2008   (KR) .................. 10-2008-0075574

(51) Int. Cl.
 *G06K 9/40* (2006.01)
(52) U.S. Cl. ........ 382/274; 348/241; 382/167; 382/199; 382/254
(58) Field of Classification Search .................. None
See application file for complete search history.

(56) References Cited

U.S. PATENT DOCUMENTS

| | | | |
|---|---|---|---|
| 2007/0009167 A1* | 1/2007 | Dance et al. | 382/254 |
| 2008/0152222 A1* | 6/2008 | Takeuchi | 382/167 |
| 2009/0034871 A1* | 2/2009 | Keshet et al. | 382/274 |
| 2009/0219417 A1* | 9/2009 | Tsuruoka | 348/241 |
| 2010/0027891 A1* | 2/2010 | Gwak et al. | 382/199 |
| 2010/0182461 A1* | 7/2010 | On | 348/241 |

* cited by examiner

*Primary Examiner* — Tsung-Yin Tsai
(74) *Attorney, Agent, or Firm* — Drinker Biddle & Reath LLP

(57) ABSTRACT

An image processing apparatus and method for quickly and effectively reducing noise in images processed by apparatuses having a low hardware specification, and a program for executing the image processing method. The image processing apparatus includes an image dividing unit for obtaining a plurality of first sub-image data items corresponding to a plurality of first sub-images that are obtained by dividing a first image corresponding to first image data, a noise reducing unit for obtaining a plurality of second sub-image data items corresponding to a plurality of second sub-images by reducing noise in the first sub-images from the first sub-image data items that are obtained by the image dividing unit, and an image synthesizing unit for obtaining second image data corresponding to a second image corresponding to the plurality of second sub-images from the plurality of second sub-image data items that are obtained by the noise reducing unit.

18 Claims, 8 Drawing Sheets

| P(1,1) | P(1,2) | P(1,3) | P(1,4) | P(1,5) | P(1,6) | P(1,7) | P(1,8) | P(1,9) |
|---|---|---|---|---|---|---|---|---|
| P(2,1) | P(2,2) | P(2,3) | P(2,4) | P(2,5) | P(2,6) | P(2,7) | P(2,8) | P(2,9) |
| P(3,1) | P(3,2) | P(3,3) | P(3,4) | P(3,5) | P(3,6) | P(3,7) | P(3,8) | P(3,9) |
| P(4,1) | P(4,2) | P(4,3) | P(4,4) | P(4,5) | P(4,6) | P(4,7) | P(4,8) | P(4,9) |
| P(5,1) | P(5,2) | P(5,3) | P(5,4) | P(5,5) | P(5,6) | P(5,7) | P(5,8) | P(5,9) |
| P(6,1) | P(6,2) | P(6,3) | P(6,4) | P(6,5) | P(6,6) | P(6,7) | P(6,8) | P(6,9) |
| P(7,1) | P(7,2) | P(7,3) | P(7,4) | P(7,5) | P(7,6) | P(7,7) | P(7,8) | P(7,9) |
| P(8,1) | P(8,2) | P(8,3) | P(8,4) | P(8,5) | P(8,6) | P(8,7) | P(8,8) | P(8,9) |
| P(9,1) | P(9,2) | P(9,3) | P(9,4) | P(9,5) | P(9,6) | P(9,7) | P(9,8) | P(9,9) |

| P(1,1) | P(1,2) | P(1,3) | P(1,4) | P(1,5) | P(1,6) | P(1,7) | P(1,8) | P(1,9) |
|---|---|---|---|---|---|---|---|---|
| P(2,1) | P(2,2) | P(2,3) | P(2,4) | P(2,5) | P(2,6) | P(2,7) | P(2,8) | P(2,9) |
| P(3,1) | P(3,2) | P(3,3) | P(3,4) | P(3,5) | P(3,6) | P(3,7) | P(3,8) | P(3,9) |
| P(4,1) | P(4,2) | P(4,3) | P(4,4) | P(4,5) | P(4,6) | P(4,7) | P(4,8) | P(4,9) |
| P(5,1) | P(5,2) | P(5,3) | P(5,4) | P(5,5) | P(5,6) | P(5,7) | P(5,8) | P(5,9) |
| P(6,1) | P(6,2) | P(6,3) | P(6,4) | P(6,5) | P(6,6) | P(6,7) | P(6,8) | P(6,9) |
| P(7,1) | P(7,2) | P(7,3) | P(7,4) | P(7,5) | P(7,6) | P(7,7) | P(7,8) | P(7,9) |
| P(8,1) | P(8,2) | P(8,3) | P(8,4) | P(8,5) | P(8,6) | P(8,7) | P(8,8) | P(8,9) |
| P(9,1) | P(9,2) | P(9,3) | P(9,4) | P(9,5) | P(9,6) | P(9,7) | P(9,8) | P(9,9) |

IMAGE PROCESSING APPARATUS AND METHOD, AND A RECORDING MEDIUM STORING A PROGRAM FOR EXECUTING THE IMAGE PROCESSING METHOD

CROSS-REFERENCE TO RELATED PATENT APPLICATION

This application claims the benefit of Korean Patent Application No. 10-2008-0075574, filed on Aug. 1, 2008, in the Korean Intellectual Property Office, the entire content of which is incorporated herein by reference.

BACKGROUND OF THE INVENTION

1. Field of the Invention

The present invention relates to an image processing apparatus and method, and a recording medium storing a program for executing the image processing method. More particularly, the present invention relates to an image processing apparatus and method for effectively and quickly reducing noise even in images processed by apparatuses having a low hardware specification, and a recording medium storing a program for executing the image processing method.

2. Description of the Related Art

In general, image processing apparatuses reproduce an image file stored in a storage medium and display an image from image data on a display unit. Digital photographing apparatuses, which are a type of image processing apparatus, photograph a subject in a shooting mode, store image data regarding the subject in a storage medium, reproduce an image file from the storage medium, and display an image from the image data on a display unit.

If the image data stored in the storage medium contains noise, the noise is also displayed on the display unit when the image file is reproduced, and the image from the image data is displayed on the display unit, thereby degrading the quality of the displayed image. Thus, the image needs to be displayed on the display unit so that the noise is not present in the image from the image data or the image data needs to be basically processed. In particular, if the image data is obtained by a digital photographing apparatus which is a type of image processing apparatus, the image data needs to be processed so that the noise is not present in the image from the image data and then stored in the storage medium.

FIG. 1 is a conceptual diagram illustrating an image Im including a total of 81 pixels (9×9 matrix). In FIG. 1, P(x,y) represents a pixel at a position (x,y). Noise may be included in the image Im. FIG. 2A is a conceptual diagram illustrating an image including small sized noises $N_1$, $N_2$, and $N_3$. FIG. 2B is a conceptual diagram for explaining the size of a filter for reducing the noises $N_1$, $N_2$, and $N_3$ in the image of FIG. 2A. Referring to FIGS. 1 and 2A, the noise $N_1$ spreads over pixels P(6,4), P(6,5), P(7,4), and P(7,5). This means that data of each of the pixels P(6,4), P(6,5), P(7,4), and P(7,5) contains noise data but does not mean that the noise $N_1$ is shaped as shown in FIG. 2A.

A noise reduction filter, e.g., a bilateral filter (BF), is used in order to reduce the noises $N_1$, $N_2$, and $N_3$. In the case of the BF, the noise data is averaged out to zero by averaging or weighted averaging data values of neighboring pixels because the distribution of the noise data generally follows a normal distribution. In order to reduce the noises $N_1$, $N_2$, and $N_3$ by using the BF, the BF needs to be applied to an area having a size equal to or greater than the size of each of the noises $N_1$, $N_2$, and $N_3$ as shown in FIG. 2B because the noise data can be averaged out to zero by the BF only when the BF is applied to the area having such a size.

FIG. 3A is a conceptual diagram illustrating an image having large sized noises $N_1$ and $N_2$, and FIG. 3B is a conceptual diagram for explaining the size of a filter for reducing the noises $N_1$ and $N_2$ of FIG. 3A. In order to average out noise data by using a BF, the BF needs to be applied to an area having a size equal to or greater than that of each of the noises $N_1$ and $N_2$ as described above. Accordingly, the BF needs to be applied to an area having a size greater than the larger one of a size $S_1$ of the noise $N_1$ and a size $S_2$ of the noise $N_2$ as shown in FIG. 3B. If the BF has a size less than each of the sizes $S_1$ and $S_2$ of the noises $N_1$ and $N_2$, the noises $N_1$ and $N_2$ cannot be reduced effectively, thereby failing to improve image quality. Therefore, when the sizes of the noises $N_1$ and $N_2$ are large, the size of the BF should also be increased.

Once the size of the BF is increased, however, the BF can reduce the noises $N_1$ and $N_2$ in the final image but data corresponding to an edge of a subject in the final image is damaged, thereby degrading image resolution. Also, once the size of the BF is increased, the amount of calculation performed by an image processing apparatus is increased sharply and a time taken to process the image is increased accordingly, thereby causing inconvenience to users. The hardware of the image processing apparatus is be increased as well in order to perform the increased amount of calculation.

SUMMARY OF THE INVENTION

The present invention provides an image processing apparatus and method for quickly and effectively reducing noise even in images processed by apparatuses having a low hardware specification, and a recording medium storing a program for executing the image processing method.

Accordingly, an embodiment of the present invention provides an image processing apparatus comprising an image dividing unit for obtaining a plurality of first sub-image data items corresponding to a plurality of first sub-images that are obtained by dividing a first image corresponding to first image data, a noise reducing unit for obtaining a plurality of second sub-image data items corresponding to a plurality of second sub-images by reducing noise in the first sub-images from the first sub-image data items that are obtained by the image dividing unit, and an image synthesizing unit for obtaining second image data corresponding to a second image corresponding to the plurality of second sub-images from the plurality of second sub-image data items that are obtained by the noise reducing unit. The image dividing unit may obtain the first sub-image data items by making the first sub-images correspond to images that are obtained by sub-sampling the first image. Also, the image dividing unit may obtain the first sub-image data items by making data of a pixel of a first sub-image correspond to data items of pixels included in an area having a predetermined size among pixels of the first image, or the image dividing unit may obtain the first sub-image data items by making data of a pixel of a first sub-image correspond to an average or a weighted average of data items of pixels included in an area having a predetermined size among pixels of the first image.

In addition, the image dividing unit may obtain the first sub-image data items by making data of one pixel of one first sub-image correspond to data of pixels included in an area having a predetermined size among pixels of the first image and by making data of another pixel adjacent to the one pixel of the one first sub-image correspond to data of pixels included in another area having the predetermined size among the pixels of the first image. The image dividing unit may also obtain the first sub-image data items by making data of one pixel of one first sub-image correspond to an average or a weighted average of data items of pixels included in an area having a predetermined size among pixels of the first image and by making data of another pixel adjacent to the one pixel of the one first sub-image correspond to an average or a weighted average of data items of pixels included in another area having the predetermined size among the pixels of the first image. The noise reducing unit may use a bilateral filter. The image synthesizing unit may obtain the second image data by making pixels of the second sub-images correspond to pixels of the second image.

Another embodiment of the present invention provides an image processing method comprising the operations of (a) obtaining a plurality of first sub-image data items corresponding to a plurality of first sub-images that are obtained by dividing a first image corresponding to first image data, (b) obtaining a plurality of second sub-image data items corresponding to a plurality of second sub-images by reducing noise in the first sub-images from the first sub-image data items, and (c) obtaining second image data corresponding to a second image corresponding to the plurality of second sub-images from the plurality of second sub-image data items. In operation (a), the first sub-images may correspond to images that are obtained by sub-sampling the first image. Also, in operation (a), data of one pixel of a first sub-image may correspond to data items of pixels included in an area having a predetermined size among pixels of the first image, or data of one pixel of a first sub-image may correspond to an average or a weighted average of data items of pixels included in an area having a predetermined size among pixels of the first image.

In addition, in operation (a), data of one pixel of one first sub-image may correspond to data items of pixels included in an area having a predetermined size among pixels of the first image, and data of another pixel adjacent to the one pixel of the one first sub-image may correspond to data items of pixels included in another area having the predetermined size among the pixels of the first image.

Also, in operation (a), data of one pixel of one first sub-image may correspond to an average or a weighted average of data items of pixels included in an area having a predetermined size among pixels of the first image, and data of another pixel adjacent to the one pixel of the one first sub-image may correspond to an average or a weighted average of data items of pixels included in another area having the predetermined size among the pixels of the first image. Operation (b) may be performed using a bilateral filter. Operation (c) may comprise obtaining second image data by making pixels of the second sub-images correspond to pixels of the second image.

Another embodiment of the present invention provides a recording medium having embodied thereon a program for executing the method.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Exemplary embodiments of the present invention will now be described more fully with reference to the accompanying drawings.

Figure 1:
FIG. 1 is a conceptual diagram illustrating an image including 81 pixels.
Figure 2A:
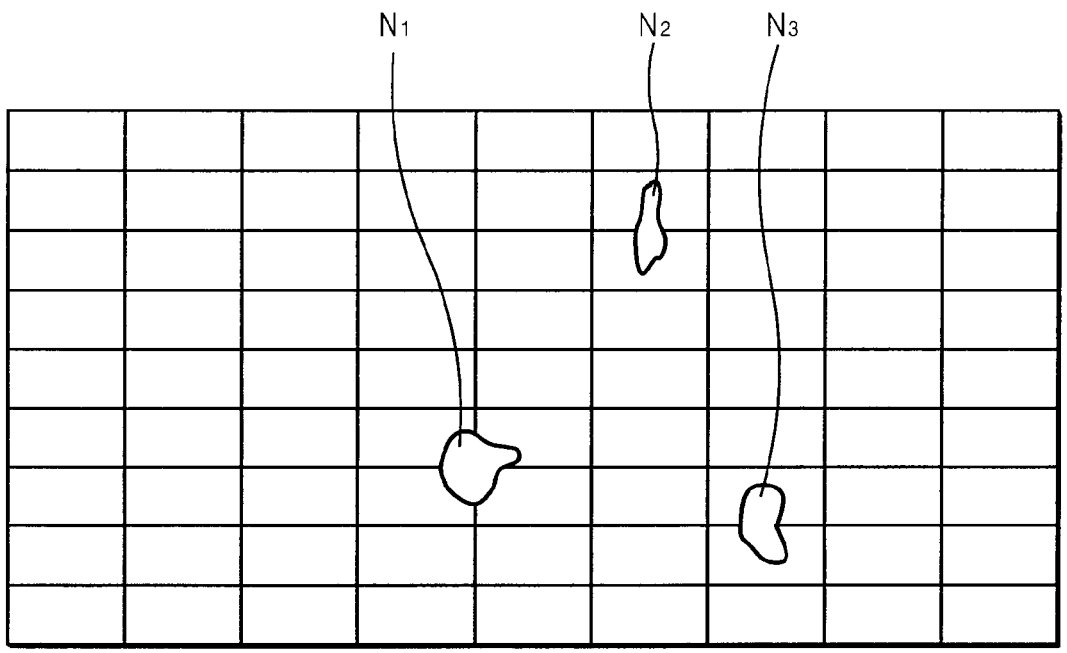
FIG. 2A is a conceptual diagram illustrating an image having small sized noises.
Figure 2B:
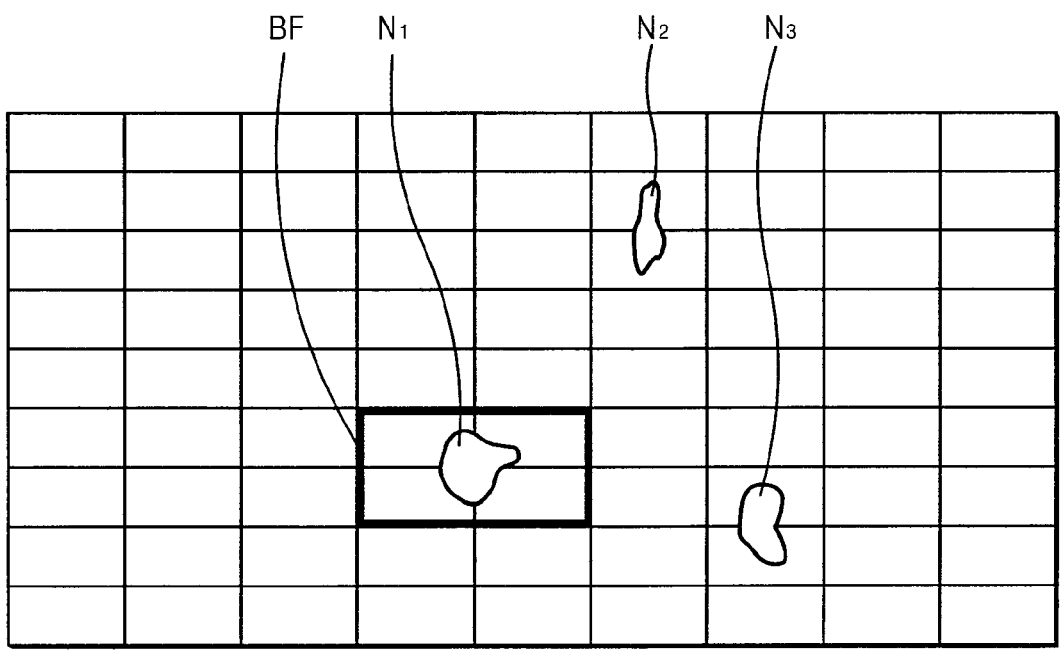
FIG. 2B is a conceptual diagram for explaining the size of a filter for reducing the noises in the image of FIG. 2A.
Figure 3A:
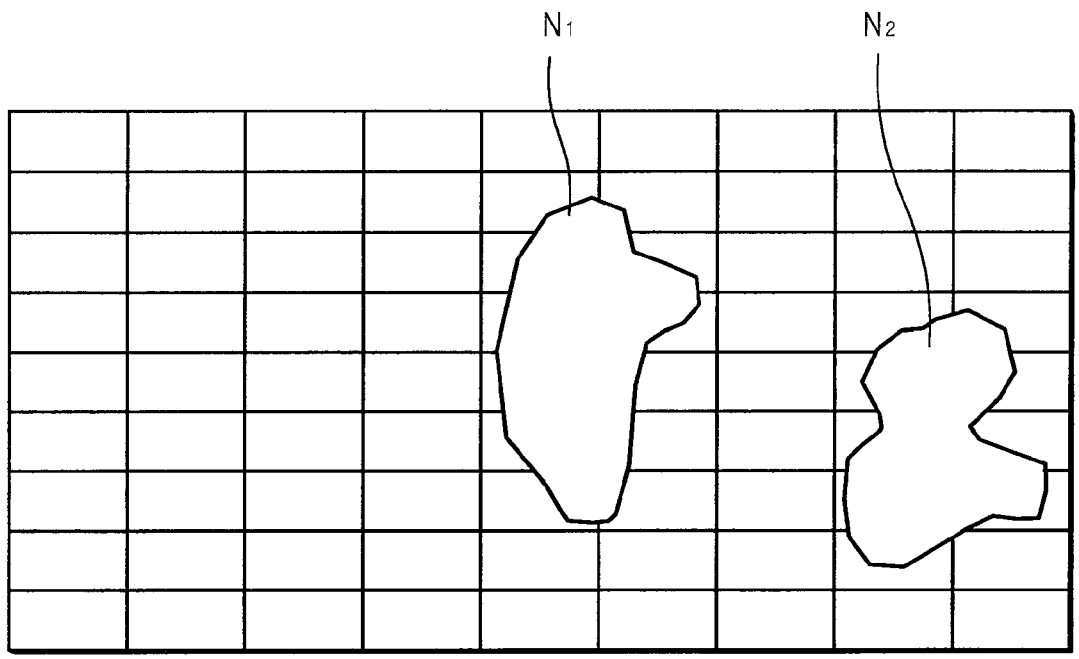
FIG. 3A is a conceptual diagram illustrating an image having large sized noises.
Figure 3B:
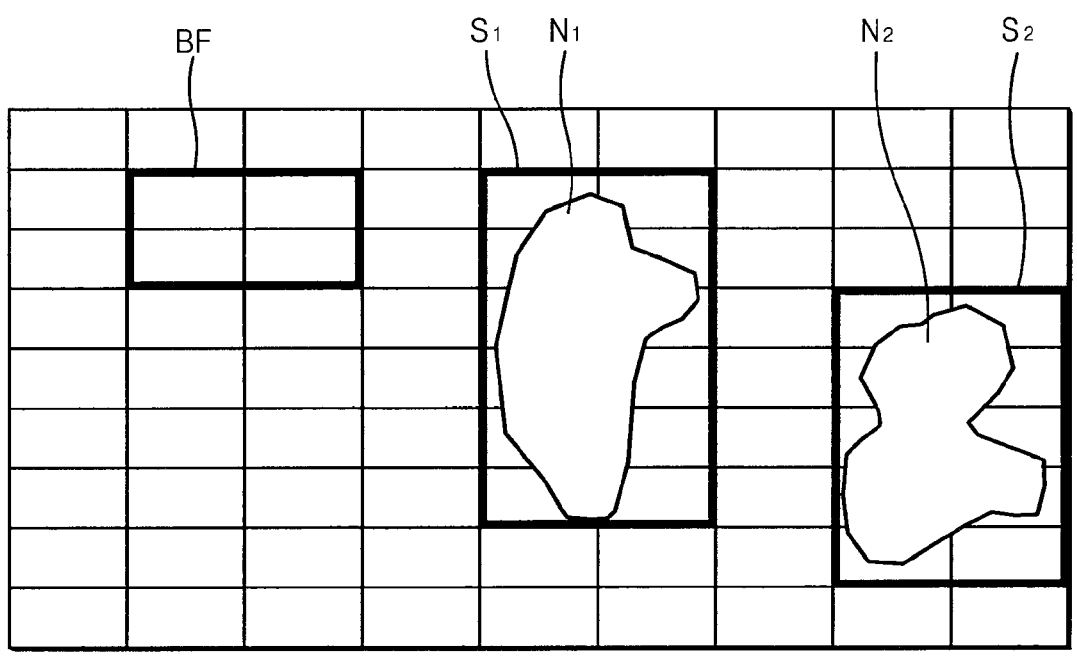
FIG. 3B is a conceptual diagram for explaining the size of a filter for reducing the large sized noises in the image of FIG. 3A.
Figure 4:
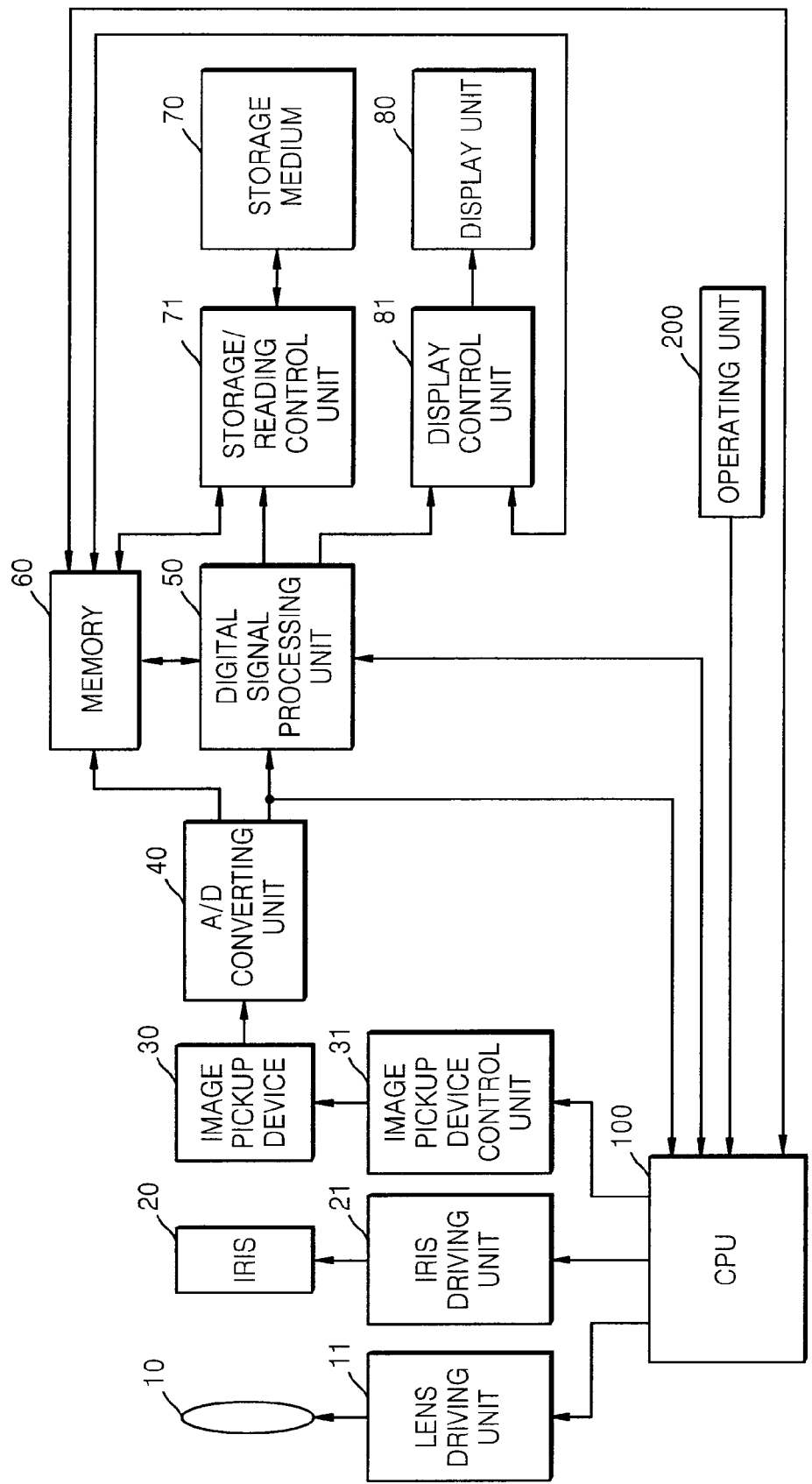
FIG. 4 is a block diagram of an example of an image processing apparatus according to an embodiment of the present invention.
Figures 5, 6:
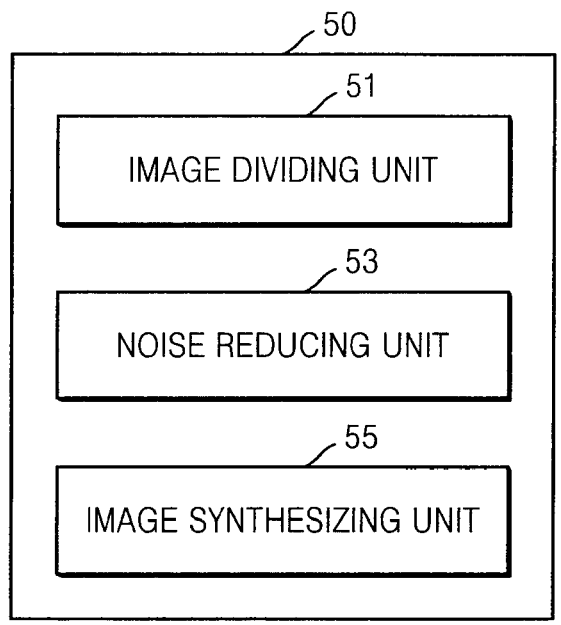
FIG. 5 is a block diagram illustrating an example of a digital signal processing unit of the image processing apparatus of FIG. 4.
FIG. 6 is a conceptual diagram illustrating an example of a first image including 81 pixels.

FIG. 4 is a block diagram of an example of an image processing apparatus, i.e., a digital photographing apparatus, according to an embodiment of the present invention. FIG. 5 is a block diagram illustrating an example of a digital signal processing unit 50 of the digital photographing apparatus of FIG. 4.

The overall operation of the digital photographing apparatus is controlled by a central processing unit (CPU) 100. The digital photographing apparatus includes an operating unit 200 that includes a key generating an electrical signal in response to a user's instruction. The electrical signal generated by the operating unit 200 is delivered to the CPU 100, and the CPU 100 can control the digital photographing apparatus in response to the electrical signal.

In a shooting mode, if the electrical signal generated in response to the user's instruction is input to the CPU 100, the CPU 100 analyzes the electrical signal and controls a lens driving unit 11, an iris driving unit 21, and an image pickup device control unit 31 such that the position of a lens 10, the degree of openness of an iris 20, and the sensitivity of an image pickup device 30 are controlled, respectively. The image pickup device 30 generates image data from incident light. An analog/digital (A/D) converting unit 40 converts analog data output from the image pickup device 30 into digital data. The A/D converting unit 400 may be omitted depending on the characteristics of the image pickup device 30.

Data output from the image pickup device 30 may be provided to the digital signal processing unit 50 via a memory 60 or without the memory 60. If necessary, the data output from the image pickup device 30 may also be provided to the CPU 100. Here, examples of the memory 60 include a read-only-memory (ROM) and a random access memory (RAM). The digital signal processing unit 50 may perform digital signal processing, such as gamma correction or white balance correction, if necessary. Referring to FIG. 5, the digital signal processing unit 50 may include an image dividing unit 51, a noise reducing unit 53, and an image synthesizing unit 55.

However, the present invention is not limited to this arrangement, and the image dividing unit 51, the noise reducing unit 53, and the image synthesizing unit 55 may be separated as independent elements from the digital signal processing unit 50. That is, any modification may be made as long as the digital photographing apparatus of FIG. 4 includes the image dividing unit 51, the noise reducing unit 53, and the image synthesizing unit 55. The operations of the image dividing unit 51, the noise reducing unit 53, and the image synthesizing unit 55 will be explained later.

Image data output from the digital signal processing unit 50 is delivered to a display control unit 81 directly or via the memory 60. The display control unit 81 controls a display unit 80 in order to display an image on the display unit 80. The image data output from the digital signal processing unit 50 is input to a storage/reading control unit 71 via the memory 60 or directly. The storage/reading control unit 71 stores the image data in a storage medium 70 in response to a signal received from the user or automatically. Alternatively, the storage/reading control unit 71 may interpret image data from an image file stored in the storage medium 70, and provide the interpretation result to the display control unit 81 via the memory 60 or by using another path so that an image can be displayed on the display unit 80. The storage medium 70 may be easily attached to and detached from the digital photographing apparatus, or be fixedly built into the digital photographing apparatus.

The functions of the image dividing unit 51, the noise reducing unit 53, and the image synthesizing unit 55 will now be explained with reference to FIGS. 6 through 8.

FIG. 6 is a conceptual diagram illustrating an example of a first image Im1 including 81 pixels (9×9 matrix). In FIG. 6, P(x,y) represents a pixel at a position (x,y). It is assumed for convenience that the first image Im1 includes 81 pixels, but the present invention is not limited to this arrangement.

The image dividing unit 51 obtains a plurality of first sub-image data items corresponding to a plurality of first sub-images that are obtained by dividing the first image Im1 corresponding to first image data. For example, the image dividing unit 51 may divide the first image Im1 corresponding to the first image data into the plurality of first sub-images and may obtain the first sub-image data items corresponding to the first sub-images. If the first image Im1 includes a total of 81 pixels (9×9 matrix), each of the first sub-images may include a total of 9 pixels (3×3 matrix). As a result, the first image Im1 may be divided into 9 first sub-images.

FIGS. 7A through 7D are conceptual diagrams illustrating examples of 4 first sub-images $SIm1_{1,1}$, $SIm1_{1,2}$, $SIm1_{1,3}$, and $SIm1_{2,1}$ of the 9 first sub-images obtained from the first image Im1 of FIG. 6.

Figure 7A:
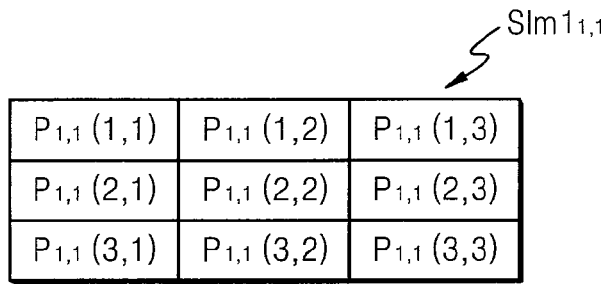
FIGS. 7A through 7D are conceptual diagrams illustrating examples of first sub-images obtained from the first image of FIG. 6.

Referring to FIG. 7A, a pixel $P_{1,1}(1,1)$ of the first sub-image $SIm1_{1,1}$ has data calculated from data items of pixels P(1,1), P(1,2), P(1,3), P(2,1), P(2,2), P(2,3), P(3,1), P(3,2), and P(3,3) of the first image Im1. For example, the pixel $P_{1,1}(1,1)$ of the first sub-image $SIm1_{1,1}$ has as data an average or a weighted average of the data items of the pixels P(1,1), P(1,2), P(1,3), P(2,1), P(2,2), P(2,3), P(3,1), P(3,2), and P(3,3) of the first image Im1. Likewise, a pixel $P_{1,1}(1,2)$ of the first sub-image $SIm1_{1,1}$ has data calculated from data items of pixels P(1,4), P(1,5), P(1,6), P(2,4), P(2,5), P(2,6), P(3,4), P(3,5), and P(3,6) of the first image Im1, and a pixel $P_{1,1}(2,1)$ of the first sub-image $SIm1_{1,1}$ has data calculated from data items of pixels P(4,1), P(4,2), P(4,3), P(5,1), P(5,2), P(5,3), P(6,1), P(6,2), and P(6,3) of the first image Im1.

Figure 7B:
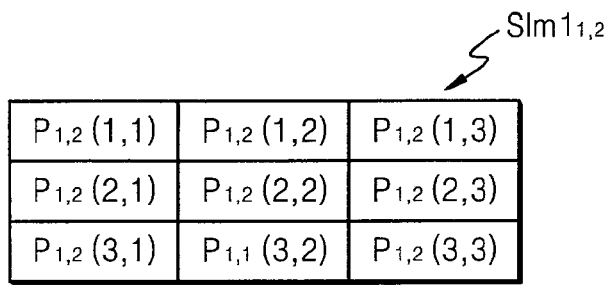

Referring to FIG. 7B, a pixel $P_{1,2}(1,1)$ of the first sub-image $SIm1_{1,2}$ has data calculated from data items of pixels P(1,2), P(1,3), P(1,4), P(2,2), P(2,3), P(2,4), P(3,2), P(3,3), and P(3,4) of the first image Im1. Likewise, a pixel $P_{1,2}(1,2)$ of the first sub-image $SIm1_{1,2}$ has data calculated from data items of pixels P(1,5), P(1,6), P(1,7), P(2,5), P(2,6), P(2,7), P(3,5), P(3,6), and P(3,7) of the first image Im1, and a pixel $P_{1,2}(2,1)$ of the first sub-image $SIm1_{1,2}$ has data calculated from data items of pixels P(4,2), P(4,3), P(4,4), P(5,2), P(5,3), P(5,4), P(6,2), P(6,3), and P(6,4) of the first image Im1. Meanwhile, a pixel $P_{1,2}(1,3)$ of the first sub-image $SIm1_{1,2}$ has data calculated from data items of pixels P(1,8), P(1,9), P(2,8), P(2,9), P(3,8), and P(3,9) of the first image Im1.

Figure 7C:
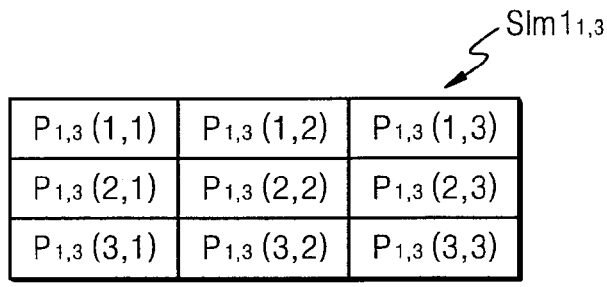

Referring to FIG. 7C, a pixel $P_{1,3}(1,1)$ of the first sub-image $SIm1_{1,3}$ has data calculated from data items of pixels P(1,3), P(1,4), P(1,5), P(2,3), P(2,4), P(2,5), P(3,3), P(3,4), and P(3,5) of the first image Im1. A pixel $P_{1,3}(1,3)$ of the first sub-image $SIm1_{1,3}$ has data calculated from data items of pixels P(1,9), P(2,9), and P(3,9) of the first image Im1.

Figure 7D:
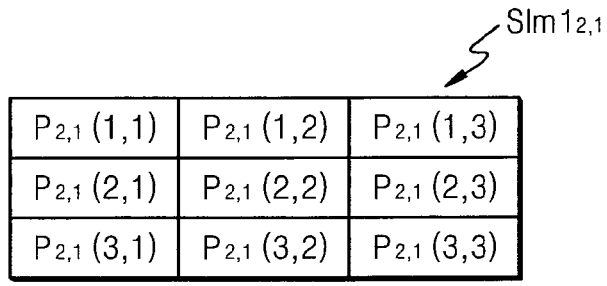

Referring to FIG. 7D, a pixel $P_{2,1}(1,1)$ of the first sub-image $SIm1_{2,1}$ has data calculated from data items of pixels P(2,1), P(2,2), P(2,3), P(3,1), P(3,2), P(3,3), P(4,1), P(4,2), and P(4,3) of the first image Im1. A pixel $P_{2,1}(1,2)$ of the first sub-image $SIm1_{2,1}$ has data calculated from data items of pixels P(2,4), P(2,5), P(2,6), P(3,4), P(3,5), P(3,6), P(4,4), P(4,5), and P(4,6) of the first image Im1, and a pixel $P_{2,1}(3,1)$ of the first sub-image $SIm1_{2,1}$ has data calculated from data items of pixels P(8,1), P(8,2), P(8,3), P(9,1), P(9,2), and P(9,3) of the first image Im1. Of course, pixels of other first sub-images not illustrated in FIGS. 7A through 7D have data calculated in the same way as that described above.

Accordingly, the image dividing unit 51 obtains the plurality of first sub-image data items corresponding to the plurality of first sub-images that are obtained by dividing the first image Im1 corresponding to the first image data. Even though the size of noise in the first image Im1 is large, the first image Im1 is divided into the plurality of first sub-images and thus the size of part of the noise distributed in each of the first sub-images is small. Accordingly, even though a noise reduction filter which is applied to each of the first sub-images has a small size, the noise in each of the first sub-images can be effectively reduced.

To summarize, the image dividing unit 51 obtains the first sub-image data items by making the data of one pixel $P_{1,1}(1,1)$ the first sub-image $SIm1_{1,1}$ correspond to the data items of the pixels P(1,1), P(1,2), P(1,3), P(2,1), P(2,2), P(2,3), P(3,1), P(3,2), and P(3,3) included in an area having a predetermined size among pixels of the first image Im1. The data of the one pixel $P_{1,1}(1,1)$ of the first sub-image $SIm1_{1,1}$ may correspond to an average or a weighted average of the data items of the pixels P(1,1), P(1,2), P(1,3), P(2,1), P(2,2), P(2,3), P(3,1), P(3,2), and P(3,3) included in the area having the predetermined size among the pixels of the first image Im1 as described above. Also, the image dividing unit 51 obtains the first sub-image data items by making the data of the one pixel $P_{1,1}(1,1)$ of the one first sub-image $SIm1_{1,1}$ correspond to the data items of the pixels P(1,1), P(1,2), P(1,3), P(2,1), P(2,2), P(2,3), P(3,1), P(3,2), and P(3,3) included in the area having the predetermined size among the pixels of the first image Im1 and by making the data of another pixel $P_{1,1}(1,1)$ adjacent to the one pixel $P_{1,1}(1,1)$ of the first sub-image $SIm1_{1,1}$ correspond to the data of the pixels P(1,4), P(1,5), P(1,6), P(2,4), P(2,5), P(2,6), P(3,4), P(3,5), and P(3,6) included in another area having the predetermined size among the pixels of the first image Im1 as described above.

The noise reducing unit 53 obtains a plurality of second sub-image data items corresponding to a plurality of second sub-images by reducing noise using a noise reduction filter in the first sub-images from the first sub-image data items obtained by the image dividing unit 51. The noise reducing unit 53 obtains data regarding the second sub-images that are obtained by reducing noise in the first sub-images. The noise reduction filter may be a bilateral filter. Even though the size of the noise reduction filter is small, the noise in each of the first sub-images can be effectively and quickly reduced as described above.

The image synthesizing unit 55 obtains second image data corresponding to a second image corresponding to the plurality of second sub-images from the plurality of second sub-image data items obtained by the noise reducing unit 53. For example, the image synthesizing unit 55 obtains the second image data by collecting the second sub-image data items. That is, the image synthesizing unit 55 may obtain the second image data by making pixels of the second sub-images correspond to pixels of the second image. Here, the second image from the second image data corresponds to the first image Im1 and is obtained by reducing noise in the first image.

Figure 8:
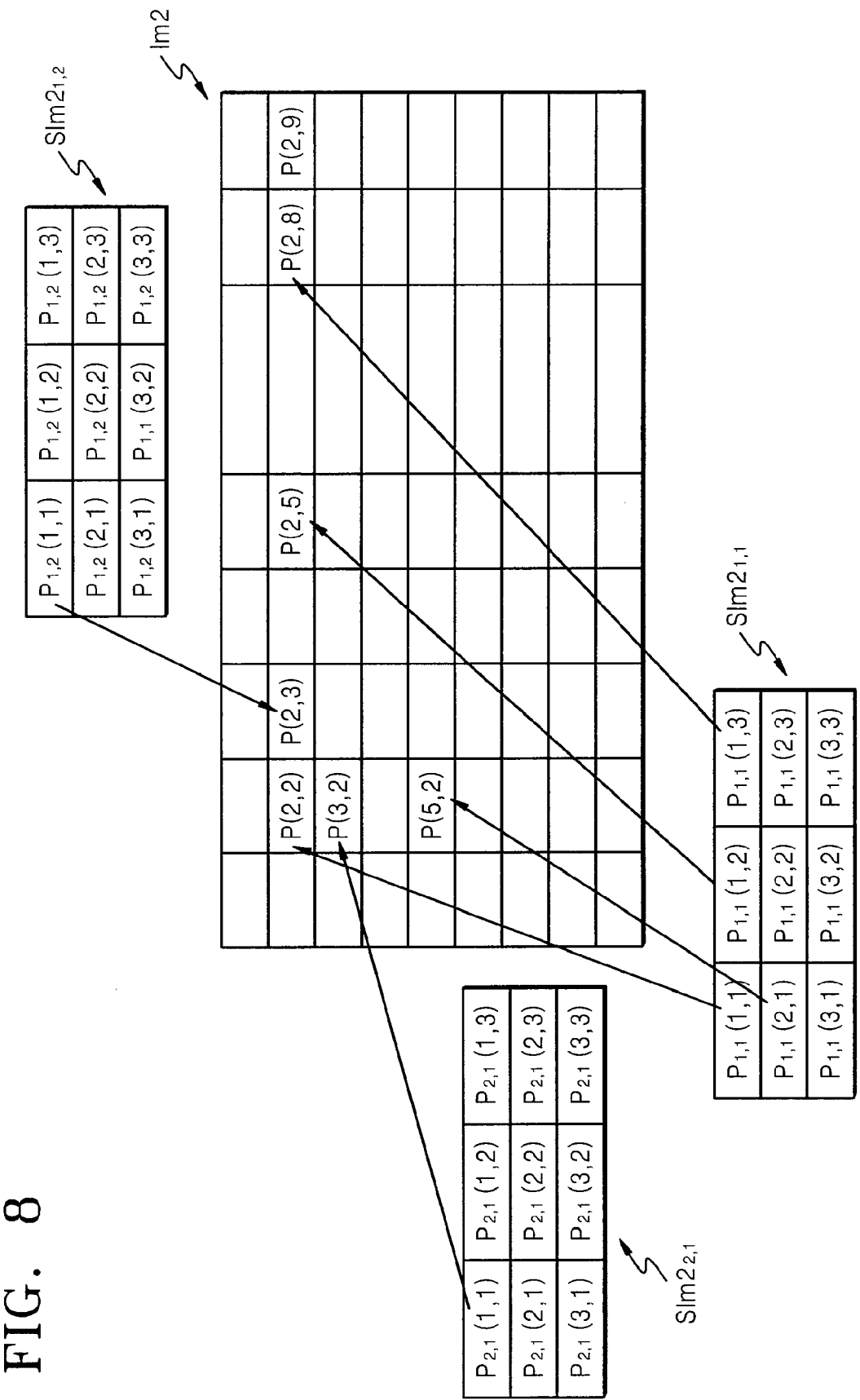
FIG. 8 is a conceptual diagram illustrating an example of a process of obtaining a second image from second sub-images.

FIG. 8 is a conceptual diagram illustrating an example of a process of obtaining the second image from the second sub-images by the image synthesizing unit 55. Referring to FIG. 8, a pixel $P_{1,1}(1,1)$ of a second sub-image $SIm2_{1,1}$ corresponds to a pixel P(2,2) of a second image Im2, a pixel $P_{1,1}(1,2)$ of the second sub-image $SIm2_{1,1}$ corresponds to a pixel P(2,5) of the second image Im2, a pixel $P_{1,1}(1,3)$ of the second sub-image $SIm2_{1,1}$ corresponds to a pixel P(2,8) of the second image Im2, and a pixel $P_{1,1}(2,1)$ of the second sub-image $SIm2_{1,1}$ corresponds to a pixel P(5,2) of the second image Im2. A pixel $P_{1,2}(1,1)$ of a second sub-image $SIm2_{1,2}$ corresponds to a pixel P(2,3) of the second image Im2. A pixel $P_{2,1}(1,1)$ of a second sub-image $SIm2_{2,1}$ corresponds to a pixel P(3,2) of the second image Im2. Since 9 second sub-images include a total of 81 pixels, the image synthesizing unit 55 obtains the second image data corresponding to the second image Im2 including a total of 81 pixels in this way. The second image Im2 corresponding to the second image data has the same size as that of the first image Im1 of FIG. 6 and is obtained by reducing noise in the first image Im2.

Even though the size of noise in an image is large, the image processing apparatus as shown in FIG. 4 can effectively reduce the noise. Although the size of the noise reduction filter is small, the image processing apparatus of FIG. 4 can effectively reduce a large sized noise. Accordingly, the image processing apparatus of FIG. 4 can achieve a high quality image without increasing the specification of hardware. In addition, since the size of the noise reduction filter is small, the number of calculations during a process of reducing noise can be remarkably reduced, thereby significantly reducing a time taken to process the image.

The image processing apparatus of FIG. 4 is the digital photographing apparatus, and thus can process image data obtained through photographing and can store in the storage medium 70 image data corresponding to an image in which noise is reduced. However, the present invention is not limited to this arrangement, and another type of image processing apparatus, such as a personal digital assistant (PDA) or a personal multimedia player (PMP), may be used instead of the digital photographing apparatus.

Although it has been described that the image dividing unit 51 obtains the first sub-image data items by making the data of the one pixel $P_{1,1}(1,1)$ of the first sub-image $SIm1_{1,1}$ correspond to the data items of the pixels P(1,1), P(1,2), P(1,3), P(2,1), P(2,2), P(2,3), P(3,1), P(3,2), and P(3,3) included in the area having the predetermined size among the pixels of the first image Im1, the present invention is not limited thereto. For example, the image dividing unit 51 may obtain the first sub-image data items by making the first sub-images correspond to images that are obtained by sub-sampling the first image Im1.

That is, referring to FIG. 7A, data of the pixel $P_{1,1}(1,1)$ of the first sub-image may correspond to data of the pixel P(2,2) of the first image Im1, data of the pixel $P_{1,1}(1,2)$ of the first sub-image $SIm1_{1,1}$ may correspond to data of the pixel P(2,5) of the first image Im1, data of the pixel $P_{1,1}(1,3)$ of the first sub-image $SIm1_{1,1}$ may correspond to data of the pixel P(2,8) of the first image Im1, and data of the pixel $P_{1,1}(2,1)$ of the first sub-image $SIm1_{1,1}$ may correspond to data of the pixel P(5,2) of the first image Im1.

Referring to FIG. 7B, data of the pixel $P_{1,2}(1,1)$ of the first sub-image $SIm1_{1,2}$ of FIG. 7B may correspond to data of the pixel P(2,3) of the first image Im1, data of the pixel $P_{1,2}(1,2)$ of the first sub-image $SIm1_{1,2}$ may correspond to data of the pixel P(2,6) of the first image Im1, data of the pixel $P_{1,2}(1,3)$ of the first sub-image $SIm1_{1,2}$ may correspond to data of the pixel P(2,9) of the first image Im1, and data of the pixel $P_{1,2}(2,1)$ of the first sub-image $SIm1_{1,2}$ may correspond to the data of the pixel P(5,3) of the first image Im1.

Referring to FIG. 7C, data of the pixel $P_{1,3}(1,1)$ of the first sub-image $SIm1_{1,3}$ of FIG. 7C may correspond to data of the pixel P(2,4) of the first image Im1, data of the pixel $P_{1,3}(1,2)$ of the first sub-image $SIm1_{1,3}$ may correspond to data of the pixel P(2,7) of the first image Im1, and data of the pixel $P_{1,3}(1,3)$ of the first sub-image $SIm1_{1,3}$ may have no data because no pixel corresponding to the pixel $P_{1,3}(1,3)$ of the first sub-image $SIm1_{1,3}$ exists in the first image Im1.

Referring to FIG. 7D, data of the pixel $P_{2,1}(1,1)$ of the first sub-image $SIm1_{2,1}$ of FIG. 7D may correspond to data of the pixel P(3,2) of the first image Im1, data of the pixel $P_{2,1}(1,2)$ of the first sub-image $SIm1_{2,1}$ may correspond to data of the pixel P(3,5) of the first image Im1, data of the pixel $P_{2,1}(1,3)$ of the first sub-image $SIm1_{2,1}$ may correspond to data of the pixel P(3,8) of the first image Im1, and data of the pixel $P_{2,1}(2,1)$ of the first sub-image $SIm1_{2,1}$ may correspond to data of the pixel P(6,2) of the first image Im1.

Accordingly, the image dividing unit 51 may obtain the first sub-image data items by making the first sub-images correspond to images that are obtained by sub-sampling the first image Im1 in this way.

Figure 9:
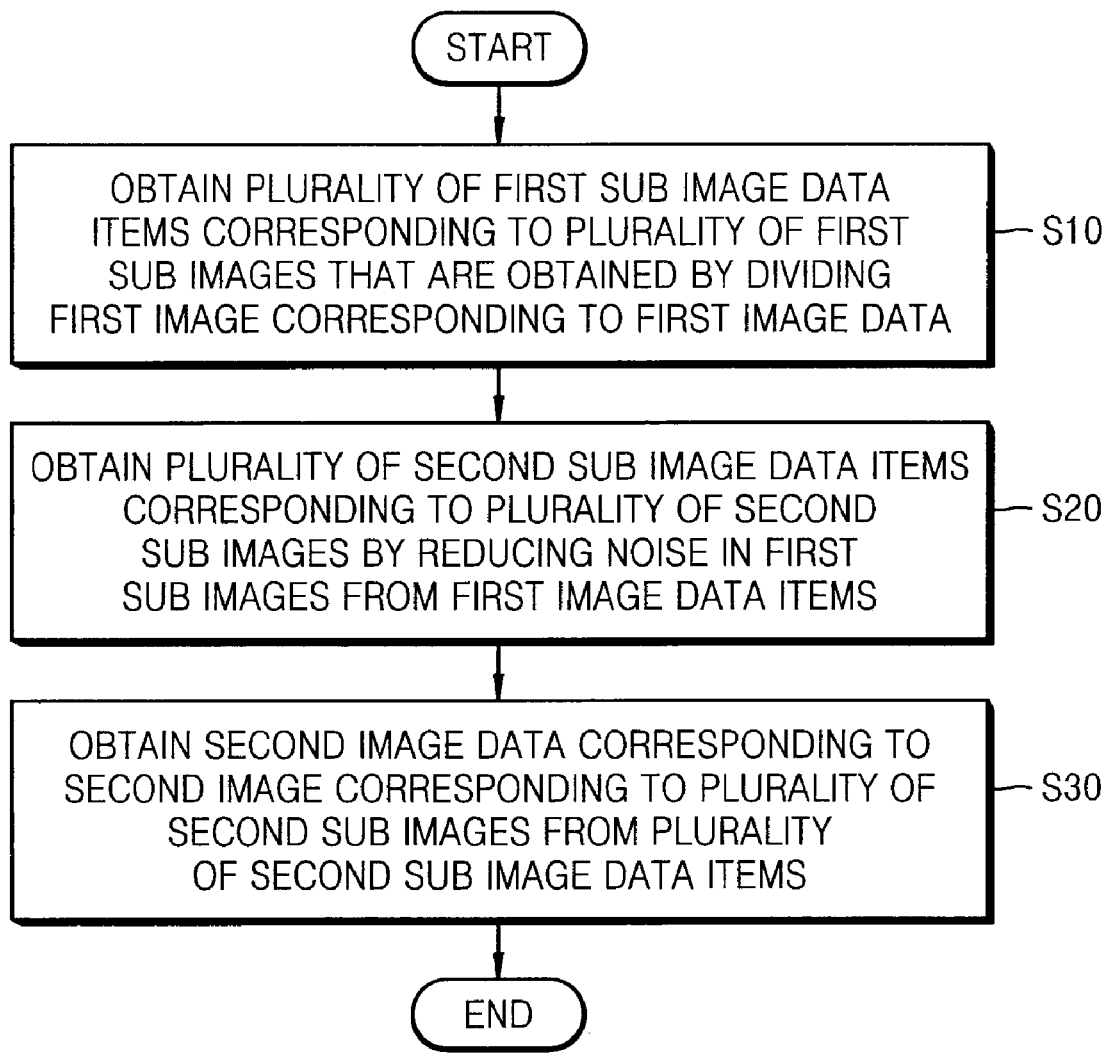
FIG. 9 is a flowchart illustrating an example of an image processing method according to an embodiment of the present invention.

FIG. 9 is a flowchart illustrating an example of an image processing method according to an embodiment of the present invention. In operation S10, a plurality of first sub-image data items corresponding to a plurality of sub-images that are obtained by dividing a first image corresponding to first image data are obtained. In operation S20, a plurality of second sub-image data items corresponding to a plurality of second sub-images are obtained by reducing noise in the first sub-images from the first sub-image data items. In operation S30, second image data corresponding to a second image corresponding to the plurality of second sub-images is obtained from the plurality of second sub-image data items. The image processing method of FIG. 9 can obtain the second image in which noise is quickly and effectively reduced by using a noise reduction filter having a small size, even though the first image data includes noise data corresponding to a large sized noise.

In operation S10, the first image may be sub-sampled. Alternatively, data of one pixel of a first sub-image may correspond to data items of pixels included in an area having a predetermined size among pixels of the first image. In this case, the data of the one pixel of the first sub-image may correspond to an average or a weighted average of the data items of the pixels included in the area having the predetermined size among the pixels of the first image. Data of one pixel of one first sub-image may correspond to data items of pixels included in an area having a predetermined size among pixels of the first image and data of another pixel adjacent to the one pixel of the one first sub-image may correspond to data items of pixels included in another area having the predetermined size among the pixels of the first image.

In operation S20, a bilateral filter may be used. In operation S30, the second image data may be obtained by making pixels of second sub-images correspond to pixels of the second image.

The above-described embodiments and modifications thereof may be stored in a recording medium having embodied thereon a program for executing the image processing method in the image processing apparatus. Here, the recording medium may be embodied as the storage medium 70 or the memory 60 of FIG. 4, or a separate recording medium. Examples of the recording medium include a magnetic recording medium, such as a ROM, a floppy disk, or a hard disk, and an optical recording medium, such as a compact disk (CD)-ROM or a digital versatile disk (DVD).

As described above, the image processing apparatus and method and the recording medium storing the program for executing the image processing method according to the present invention can quickly and effectively reduce noise even in images processed by apparatuses having a low hardware specification.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. An image processing apparatus comprising:
an image dividing unit that obtains a plurality of first sub-image data items corresponding to a plurality of first sub-images that are obtained by dividing a first image corresponding to first image data, wherein the image dividing unit obtains the first sub-image data items by making data of one pixel of one first sub-image correspond to an average or a weighted average of data items of pixels included in an area having a predetermined size among pixels of the first image and by making data of another pixel adjacent to the one pixel of the one first sub-image correspond to an average or a weighted average of data items of pixels included in another area having the predetermined size among the pixels of the first image;
a noise reducing unit that obtains a plurality of second sub-image data items corresponding to a plurality of second sub-images by reducing noise in the first sub-images from the first sub-image data items that are obtained by the image dividing unit; and
an image synthesizing unit that obtains second image data corresponding to a second image corresponding to the plurality of second sub-images from the plurality of second sub-image data items that are obtained by the noise reducing unit.

2. The image processing apparatus of claim 1, wherein the image dividing unit obtains the first sub-image data items by making the first sub-images correspond to images that are obtained by sub-sampling the first image.

3. The image processing apparatus of claim 1, wherein the image dividing unit obtains the first sub-image data items by making data of a pixel of a first sub-image correspond to data items of pixels included in an area having a predetermined size among pixels of the first image.

4. The image processing apparatus of claim 1, wherein the image dividing unit obtains the first sub-image data items by making data of a pixel of a first sub-image correspond to an average or a weighted average of data items of pixels included in an area having a predetermined size among pixels of the first image.

5. The image processing apparatus of claim 1, wherein the image dividing unit obtains the first sub-image data items by making data of one pixel of one first sub-image correspond to data of pixels included in an area having a predetermined size among pixels of the first image and by making data of another pixel adjacent to the one pixel of the one first sub-image correspond to data of pixels included in another area having the predetermined size among the pixels of the first image.

6. The image processing apparatus of claim 1, wherein the noise reducing unit uses a bilateral filter.

7. The image processing apparatus of claim 1, wherein the image synthesizing unit obtains the second image data by making pixels of the second sub-images correspond to pixels of the second image.

8. An image processing method comprising:
(a) obtaining a plurality of first sub-image data items corresponding to a plurality of first sub-images that are obtained by dividing a first image corresponding to first image data, wherein data of one pixel of one first sub-image corresponds to an average or a weighted average of data items of pixels included in an area having a predetermined size among pixels of the first image, and data of another pixel adjacent to the one pixel of the one first sub-image corresponds to an average or a weighted average of data items of pixels included in another area having the predetermined size among the pixels of the first image;
(b) obtaining a plurality of second sub-image data items corresponding to a plurality of second sub-images by reducing noise in the first sub-images from the first sub-image data items; and
(c) obtaining second image data corresponding to a second image corresponding to the plurality of second sub-images from the plurality of second sub-image data items.

9. The image processing method of claim 8, wherein, in operation (a), the first sub-images correspond to images that are obtained by sub-sampling the first image.

10. The image processing method of claim 8, wherein, in operation (a), data of one pixel of a first sub-image corresponds to data items of pixels included in an area having a predetermined size among pixels of the first image.

11. The image processing method of claim 8, wherein, in operation (a), data of one pixel of a first sub-image corresponds to an average or a weighted average of data items of pixels included in an area having a predetermined size among pixels of the first image.

12. The image processing method of claim 8, wherein, in operation (a), data of one pixel of one first sub-image corresponds to data items of pixels included in an area having a predetermined size among pixels of the first image, and data of another pixel adjacent to the one pixel of the one first sub-image corresponds to data items of pixels included in another area having the predetermined size among the pixels of the first image.

13. The image processing method of claim 8, wherein operation (b) is performed using a bilateral filter.

14. The image processing method of claim 8, wherein operation (c) comprises obtaining second image data by making pixels of the second sub-images correspond to pixels of the second image.

15. A non-transitory recording medium having embodied thereon a program for controlling a computer to (a) obtain a plurality of first sub-image data items corresponding to a plurality of first sub-images that are obtained by dividing a first image corresponding to first image data, wherein data of one pixel of one first sub-image corresponds to an average or a weighted average of data items of pixels included in an area having a predetermined size among pixels of the first image, and data of another pixel adjacent to the one pixel of the one first sub-image corresponds to an average or a weighted average of data items of pixels included in another area having the predetermined size among the pixels of the first image, (b) obtain a plurality of second sub-image data items corresponding to a plurality of second sub-images by reducing noise in the first sub-images from the first sub-image data items, and (c) obtain second image data corresponding to a second image corresponding to the plurality of second sub-images from the plurality of second sub-image data items.

16. The recording medium of claim 15, wherein, in operation (a), the first sub-images correspond to images that are obtained by sub-sampling the first image.

17. The recording medium of claim 15, wherein, in operation (a), data of one pixel of a first sub-image corresponds to data items of pixels included in an area having a predetermined size among pixels of the first image.

18. The recording medium of claim 15, wherein, in operation (a), data of one pixel of a first sub-image corresponds to an average or a weighted average of data items of pixels included in an area having a predetermined size among pixels of the first image.

* * * * *